3,003,889
CELLULOSE ESTER PLASTIC COMPOSITIONS CONTAINING DI-ISOOCTYL DIPHENYL ETHER
John W. Tamblyn and Gordon C. Newland, Kingsport, Tenn., assignors to Eastman Kodak Company, Rochester, N.Y., a corporation of New Jersey
No Drawing. Filed June 19, 1959, Ser. No. 821,363
5 Claims. (Cl. 106—188)

This invention relates to cellulose organic acid ester plastics, and more particularly to the plasticization and stabilization of such plastics.

As is well known in the art, plastics having excellent properties for a great many purposes can be prepared from cellulose organic acid esters, such, for example, as cellulose acetate, cellulose propionate, cellulose butyrate, cellulose acetate-propionate and cellulose acetate-butyrate, with suitable plasticizers. However, cellulose organic acid ester plastics have not been entirely suitable for use in places where they are exposed to a considerable amount of ultraviolet light: e.g., out of doors. After one or two months of outdoor exposure in a sunny climate, the plastic bleached and became increasingly brittle until, at the end of from three to six months, depending on the severity of the climate, crazing occurred. The rapid deterioration of appearance was accompanied by an equally rapid breakdown in physical properties, such as strength. Many of the common plasticizers for cellulose ester plastics, particularly for cellulose acetate butyrate plastics, are not very effective from the point of view of weathering resistance of the plastic. A few, such as dibutyl sebacate, dioctyl phthalate and di-isobutyl azelate, are superior in this respect, and in general use at this time for outdoor applications of cellulose acetate butyrate plastics. However, even with the plasticizers it is customary to use a small proportion of a stabilizing material along with the plasticizer for outdoor use. Some compounds whose addition to the plastic composition inhibits physical breakdown of the plastic, cause intense discoloration when the plastic is exposed for any length of time to sunlight or other source of ultraviolet light.

We have found that a substantial further improvement in weatherability, over that obtained with the superior plasticizers mentioned above, can be obtained by replacing part of the plasticizer by an equal amount of di-isooctyl diphenyl ether. Complete substitution of the conventional plasticizer by the di-isooctyl diphenyl ether gives a hard plastic having inadequate toughness for many applications. The mixtures of plasticizers represent a compromise between toughness and weatherability. The concentration of di-isooctyl diphenyl ether to be used is determined by the relative importance of these properties in any given application. The amount of plasticizer used in cellulose acetate-butyrate compositions ordinarily is within the range of from 5 to 50 parts by weight of plasticizer per 100 parts by weight of cellulose acetate-butyrate. In carrying out our invention, preferably from one-fourth to one-half of the conventional ester plasticizer may be replaced by di-isooctyl diphenyl ether, that is, the ratio by weight of di-isooctyl diphenyl ether to conventional ester plasticizer may be within the range of 1:3 to 1:1.

In compounding and testing the compositions of our invention, the following procedure was used.

The plasticizers and light-stabilizing additives were compounded on rolls for 4 minutes with cellulose acetate butyrate containing 13% acetyl and 38% butyryl. The temperature of the front roll was 270° F., and that of the rear roll was 230° F. The rolled composition was compression-molded at 320° F. into sheets of 0.050 inch thickness. Exposures of these sheets to artificial weathering in a modified Atlas Twin-Arc weatherometer (Anal. Chem. 25, 460 (1953)), and to natural weathering outdoors at Kingsport, Tennessee, and in Arizona were carried out. The progress of weathering was followed by quantitative measurements of inherent viscosity, flexural strength, brittleness and weight loss. Inherent viscosities were measured on acetone solutions containing 0.23 g. cellulose ester per 100 cc. acetone. Flexural strength and brittleness were measured by the Tour-Marshall test for stiffness in flexure (A.S.T.M. D747–43), brittleness being defined to have developed in the sample when it broke at a bend angle of less than 90°. Usually the samples became brittle when either viscosity or flexural strength decayed to about 75% of the original values before exposure.

Our invention is illustrated by the following examples:

*Example 1.*—A composition consisting of 100 parts cellulose acetate butyrate, 12 parts of dibutyl sebacate and 1 part of phenyl salicylate was compared, for weatherability in the modified weatherometer, with a similar composition in which 5 parts of the dibutyl sebacate was replaced by 5 parts of di-isooctyl diphenyl ether. The former composition lost 25% of its initial flexural strength and became brittle after 700 hours' exposure. The latter composition, on the other hand, required 1400 hours' exposure to reach an equivalent stage of deterioration. Exposure times required for 25% loss of initial inherent viscosities were 500 to 1900 hours respectively, for the two compositions. A third composition, in which all of the dibutyl sebacate of the first composition was replaced by di-isooctyl diphenyl ether, when tested in the same way, became brittle in only 400 hours.

*Example 2.*—The three compositions of Example 1, when weathered outdoors at Kingsport, Tennessee, showed a similar superiority of the plastic made from the mixed plasticizer. That containing dibutyl sebacate as the sole plasticizer became brittle in 5 years, and lost 4% and 10% of its original weight during 3 and 7 years' exposure, respectively. That containing the mixed plasticizers lost only 1% of its original weight during 3 years' exposure and less than 4% in 7 years, and was still tough after 8 years' exposure. That containing di-isooctyl diphenyl ether as the sole plasticizer became brittle in only 1 year.

Thus, by itself, the di-isooctyl diphenyl ether was not nearly as good as the ester plasticizer, yet its substitution for part of the latter greatly improved the weathering performance over that of the plastic containing the ester plasticizer alone.

*Example 3.*—Cellulose acetate-butyrate plastic containing 8.5 parts of dibutyl sebacate, 1 part of phenyl salicylate and 0.015 part of a red azo dye per 100 parts of cellulose acetate-butyrate was weathered outdoors at Kingsport, Tennessee, along with a similar composition in which 4 parts of the dibutyl sebacate had been replaced by 4 parts of di-isooctyl diphenyl ether. After 1 year exposure all of the red color had faded from the former plastic. The latter showed only slight fading at the end of 1 year and was still red after 3 years.

*Example 4.*—A yellow-pigmented composition containing 100 parts of cellulose acetate-butyrate, 12 parts of dioctyl phthalate and 4 parts of lead chromate was exposed outdoors at Kingsport, Tennessee, for 5 years. At the end of this time it had a dull and dirty surface. A similar composition, in which half of the dioctyl phthalate was replaced by di-isooctyl diphenyl ether, exposed for the same time, still had a smooth clean surface. This is a valuable property for outdoor applications such as signs.

Cellulose acetate-butyrate compositions similar to those described in Examples 1 to 4, covering the color range from clear to black, were weathered outdoors in Arizona. In all cases, those containing the mixed plasticizers were found to show marked improvements in retention of toughness and surface gloss over the corresponding compositions containing a single conventional plasticizer.

Di-isooctyl diphenyl ether may be prepared by heating diphenyl ether with from 1.0 to 10.0 percent of its weight of a bleaching earth or other Friedel-Crafts catalyst and introducing isooctyl alcohol gradually and preferably with stirring, while maintaining the mixture at a reaction temperature, preferably between 125° and 175° C.

We claim:

1. A cellulose organic acid ester plastic composition comprising a cellulose ester selected from the group consisting of cellulose acetate, cellulose propionate, cellulose butyrate, cellulose acetate-propionate and cellulose acetate-butyrate, containing from 5 to 50 parts by weight, per 100 parts by weight of cellulose ester, of a mixture of ester plasticizer for the cellulose ester and di-isooctyl diphenyl ether, the ratio by weight of the amount of the ester plasticizer to the amount of di-isooctyl diphenyl ether being from 1:1 to 3:1.

2. A cellulose acetate-butyrate plastic composition containing, per 100 parts by weight of cellulose acetate-butyrate, from 5 to 50 parts by weight of a mixture of di-isooctyl diphenyl ether and ester plasticizer for the cellulose acetate-butyrate, the ratio by weight of di-isooctyl diphenyl ether to ester plasticizer being within the range of from 1:3 to 1:1.

3. A composition according to claim 2, in which the conventional ester plasticizer is dibutyl sebacate.

4. A composition according to claim 2, in which the conventional ester plasticizer is dioctyl phthalate.

5. A composition according to claim 2, in which the conventional ester plasticizer is di-isobutyl azelate.

References Cited in the file of this patent

UNITED STATES PATENTS

| | | |
|---|---|---|
| 2,121,723 | Bass et al. | June 21, 1938 |
| 2,331,265 | Coleman et al. | Oct. 5, 1943 |

OTHER REFERENCES

Buttrey: "Plasticizers," second edition, 1957, page 117.